(12) United States Patent
Samdanis et al.

(10) Patent No.: US 11,172,336 B2
(45) Date of Patent: Nov. 9, 2021

(54) LOGICAL RADIO NETWORK

(71) Applicant: NOKIA SOLUTIONS AND NETWORKS OY, Espoo (FI)

(72) Inventors: Konstantinos Samdanis, Munich (DE); Wieslawa Wajda, Keltern (DE); Christian Mannweiler, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/140,403

(22) Filed: Jan. 4, 2021

(65) Prior Publication Data

US 2021/0227353 A1   Jul. 22, 2021

(30) Foreign Application Priority Data

Jan. 22, 2020   (FI) ..................................... 20205063

(51) Int. Cl.
| | |
|---|---|
| H04L 12/46 | (2006.01) |
| H04W 4/08 | (2009.01) |
| H04W 76/10 | (2018.01) |
| H04W 76/30 | (2018.01) |
| H04W 48/08 | (2009.01) |
| H04W 36/00 | (2009.01) |

(52) U.S. Cl.
CPC ......... *H04W 4/08* (2013.01); *H04W 36/0009* (2018.08); *H04W 48/08* (2013.01); *H04W 76/10* (2018.02); *H04W 76/30* (2018.02)

(58) Field of Classification Search
None
See application file for complete search history.

(56) References Cited

U.S. PATENT DOCUMENTS

| | | | |
|---|---|---|---|
| 2015/0138952 A1 | 5/2015 | Tamura et al. | |
| 2015/0222546 A1 | 8/2015 | Van Phan et al. | |
| 2019/0166523 A1* | 5/2019 | Shaw ..................... | H04W 48/18 |
| 2019/0261260 A1* | 8/2019 | Dao ........................ | H04W 8/20 |
| 2021/0136649 A1* | 5/2021 | Shah ................. | H04W 74/0833 |

FOREIGN PATENT DOCUMENTS

| | | |
|---|---|---|
| EP | 2 843 887 A1 | 3/2015 |
| WO | WO 2017/053742 A1 | 3/2017 |
| WO | WO 2017/074486 A1 | 5/2017 |

(Continued)

OTHER PUBLICATIONS

Office Action dated May 14, 2020 corresponding to Finnish U.S. Appl. No. 20205063.

(Continued)

*Primary Examiner* — Ayanah S George
(74) *Attorney, Agent, or Firm* — Squire Patton Boggs (US) LLP

(57) ABSTRACT

An apparatus, method and computer program, are configured to serve a first logical radio network and a second logical radio network. Information on the first logical radio network is received, and at least one group of terminal devices associated with the first logical radio network is identified. An instruction is sent to a network function to establish a connection to the second logical radio network for the at least one group of terminal devices.

16 Claims, 5 Drawing Sheets

(56) References Cited

FOREIGN PATENT DOCUMENTS

WO  WO 2017/174550 A1  10/2017
WO  WO 2019/133049 A1  7/2019

OTHER PUBLICATIONS

Finnish Search Report dated May 14, 2020 corresponding to Finnish Application No. 20205063.
Communication of Acceptance under section 29a of Patents Decree dated Oct. 8, 2020 corresponding to Finnish Application No. 20205063.
Extended European Search Report dated May 7, 2021 corresponding to European Patent Application No. 20207473.8.

* cited by examiner

LOGICAL RADIO NETWORK

TECHNICAL FIELD

The present application relates generally to logical radio networks. More specifically, the present application relates to establishing a connection to a logical radio network

BACKGROUND

Users creating and consuming more and more content and new technologies such as autonomous driving and internet of things (IoT) cause different kinds of requirements such as low latency and quality of service for radio access networks (RAN).

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: serving a first logical radio network and a second logical radio network, receiving information on the first logical radio network, identifying at least one group of terminal devices associated with the first logical radio network, and sending an instruction to a radio network function to establish a connection to the second logical radio network for the at least one group of terminal devices.

According to a second aspect of the invention, there is provided a method comprising: serving a first logical radio network and a second logical radio network, receiving information on the first logical radio network, identifying at least one group of terminal devices associated with the first logical radio network, and sending an instruction to a radio network function to establish a connection to the second logical radio network for the at least one group of terminal devices.

According to a third aspect of the invention, there is provided a computer program comprising instructions for causing an apparatus to perform at least the following: serving a first logical radio network and a second logical radio network, receiving information on the first logical radio network, identifying at least one group of terminal devices associated with the first logical radio network, and sending an instruction to a radio network function to establish a connection to the second logical radio network for the at least one group of terminal devices.

According to a fourth aspect of the invention, there is provided an apparatus comprising at least one processor and at least one memory including computer program code, the at least one memory and the computer program code configured to with the at least one processor, cause the apparatus at least to: serve a first logical radio network and a second logical radio network, receive information on the first logical radio network, identify at least one group of terminal devices associated with the first logical radio network, and send an instruction to a radio network function to establish a connection to the second logical radio network for the at least one group of terminal devices.

According to a fifth aspect of the invention, there is provided a non-transitory computer readable medium comprising program instructions for causing an apparatus to perform at least the following: serving a first logical radio network and a second logical radio network, receiving information on the first logical radio network, identifying at least one group of terminal devices associated with the first logical radio network, and sending an instruction to a radio network function to establish a connection to the second logical radio network for the at least one group of terminal devices.

According to a sixth aspect of the invention, there is provided a computer readable medium comprising program instructions for causing an apparatus to perform at least the following: serving a first logical radio network and a second logical radio network, receiving information on the first logical radio network, identifying at least one group of terminal devices associated with the first logical radio network, and sending an instruction to a radio network function to establish a connection to the second logical radio network for the at least one group of terminal devices.

According to a seventh aspect of the invention, there is provided a system configured to serve a first logical radio network and a second logical radio network, receive information on the first logical radio network, identify at least one group of terminal devices associated with the first logical radio network, and send an instruction to a radio network function to establish a connection to the second logical radio network for the at least one group of terminal devices.

BRIEF DESCRIPTION OF THE DRAWINGS

Some example embodiments will now be described with reference to the accompanying drawings.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to a group handover of terminal devices from a first logical radio network to a second logical radio network. More specifically, example embodiment, relate to a network driven group handover.

According to an example embodiment, an apparatus is configured to serve a first logical radio network and second logical radio network. The first logical radio network may comprise a first network slice and the second logical radio network may comprise a second network slice. The apparatus is further configured to receive information on the first logical radio network and identify at least one group of terminal devices associated with the first logical radio network. The apparatus is further configured to send an instruction to a network function to establish a connection to the second logical radio network for the at least one group of terminal devices.

In the following, different exemplifying embodiments will be described using, as an example of an access architecture to which the embodiments may be applied, a radio access architecture based on long term evolution advanced (LTE Advanced, LTE-A, 4G) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
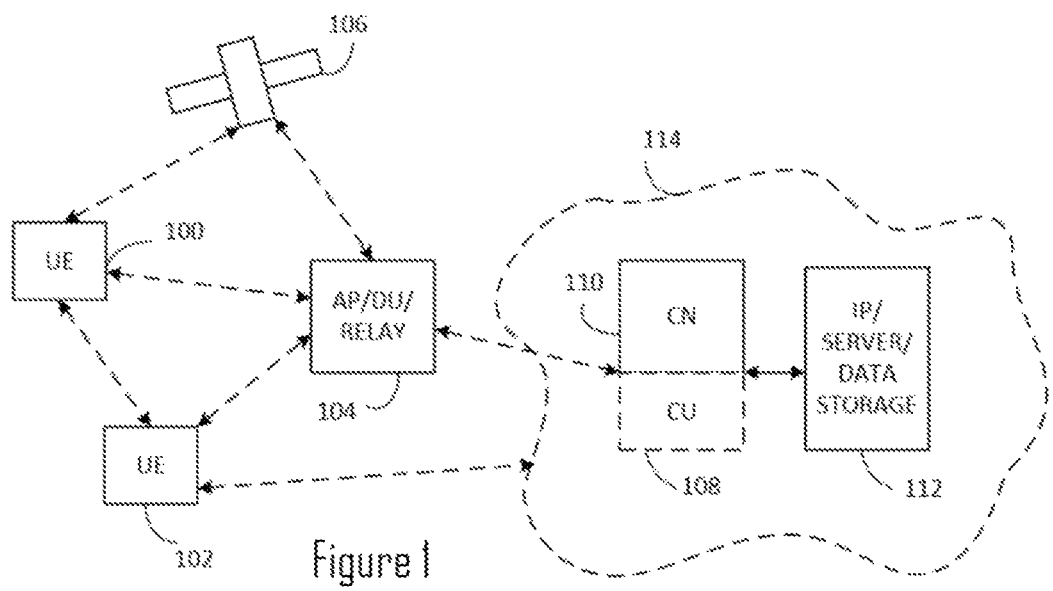
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g)NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing connectivity of devices to external packet data networks, or mobile management entity (MME), etc.

The device (also called user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device refers, for example, to a device such as a portable or non-portable computing device that includes a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, for example, to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications, such as, (massive) machine-type communications (mMTC), including vehicular safety, different sensors and real-time control. 5G is expected to operate in multiple frequency bands, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-frequency operability (such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108). It should be noted that FIG. 1 is for illustrative purposes and the different blocks could be presented in different manners. For example, block 108 could also be presented as a separate node between a DU 104 and CN 110, or as a part of block 104.

It should also be understood that the distribution of functions between core network operations and base station operations may differ from that of the LTE or even be non-existent. Some other technology advancements probably to be used are Big Data and all-IP, which may change the way networks are being constructed and managed. 5G networks are being designed to support multiple hierarchies, where MEC servers can be placed between the core and the base station or (e/g)NodeB (e/gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a (e/g)NodeB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

As commonly known in connection with wireless communication systems, control or management information is transferred over a radio interface, e.g. between the terminal device 100 and the access node 104.

A radio access network (RAN) may be used for hosting different kinds of services, which may cause conflicting requirements on the same infrastructure. Network slicing enables segmenting the RAN and creating multiple independent and dedicated virtual sub-networks within the same infrastructure. In other words, network slicing comprises creating a plurality of logical networks on top of a common shared physical infrastructure. A logical radio network comprises a network slice configured to serve a plurality of terminal devices. Therefore, network slicing enables running services that have different requirements on latency, reliability, throughput and/or mobility. A network slice may span across multiple parts of network such as radio access network, core network and/or transport network and it may also be deployed across multiple operators.

As mentioned above, network slicing comprises abstracting network resources from underlying physical hardware in order to customize distinct parts of the network. This may be facilitated by separating a mobile network into a control plane (CP) comprising control plane functions (CPFs) and a user plane (UP) comprising user plane functions (UPFs). A CP comprises protocols for controlling sessions and a connection between a user equipment (UE) and the network, while a UP comprises protocols for implementing an actual session service which carries user data.

Data traffic in different logical radio networks is handled by different protocol data unit (PDU) sessions. A PDU session comprises an association between a UE and a data network. Data over the network is transferred in a Protocol Data Unit that comprises a specific block of information/ data. PDUs are exchanged between the UE and the data network via the PDU session that is established upon request from the UE. A UE may establish one or more PDU sessions. A PDU session may be created, updated and removed by a session management function (SMF).

An SMF is configured to interact with the decoupled user plane, manage in terms of creating, updating and/or removing protocol data unit (PDU) sessions, and manage session context with the user plane function (UPF) that is configured to support data packet routing and forwarding, and data packet inspection, for example. A UPF may be dedicated to a particular logical radio network or may be shared among different logical radio networks. An SMF may be a dedicated resource such that an SMF may be configured to serve a single logical radio network or may be shared among different logical radio networks. An SMF is further configured to communicate with other network functions (NFs) such as an access and mobility management function (AMF).

According to an example embodiment, a request from a UE to establish a PDU session is received by an access and mobility management function (AMF). An AMF is configured to receive the request and handle aspects relating to connection and mobility management and forward session management requirements to an SMF. An AMF is further configured to determine which SMF is suitable for handling the connection request. An AMF may be a shared resource such that a single AMF may be configured to serve a plurality of logical radio networks with which a UE is associated.

For example, when a terminal device such as a UE interacts with an AMF and initiates a PDU session request to the AMF, the AMF selects an SMF that will establish and manage the PDU session. The SMF determines whether the requested PDU session is compliant with the terminal device's subscription and if the request is compliant, the SMF selects a UPF that will host the PDU session. A terminal device may have a plurality of PDU sessions and the PDU sessions may be managed by different SMFs and hosted on different UPFs.

A logical radio network such as a network slice for a UE may be selected based on a request from the UE or based on default selections. Default selections are maintained by a unified data management (UDM). The default selections comprise a set of subscribed logical radio networks. A UDM is configured to store subscriber data and subscriber profiles and a UDM is further configured to support user identification handling, access control and authorization, authentication management and subscription management. Subscriber data comprises at least an identification of a subscriber identification module (SIM), for example, a SIM card. Subscriber data may comprise an international mobile subscriber identity (IMSI) or subscription permanent identifier (SUPI).

A logical radio network may be identified based on a network slice identifier associated with the logical radio network. According to an example embodiment, a network slice identifier comprises a single network slice selection assistance information (S-NSSAI). According to an example embodiment, a network slice identifier comprises a slice/ service type (SST) component and a slice differentiator (SD). An SST comprises information on a type of service to which the network slice is designed and an SD comprises information for differentiating different network slices of a same service type.

A UE may comprise a set of pre-configured S-NSSAIs stored in a local storage and the UE may be configured to request access to a set of logical radio networks based on the stored set of pre-configured S-NSSAIs. The requested set of pre-configured S-NSSAIs may comprise a subset of the pre-configured S-NSSAI. The request is sent from the UE via an access and mobility management function (AMF) to a network slice selection function (NSSF). The AMF is configured to receive information on the set of subscribed S-NSSAIs from the UDM and add the set of subscribed S-NSSAIs to the request from the UE to the NSSF to access to a set of network slices.

The NSSF is configured to reply to the UE via the AMF with a set of allowed S-NSSAIs. The UE is configured to receive and store the allowed S-NSSAIs.

A logical radio network such as a network slice may be configured to support a specific use case such as smart home, the Internet of Things (IoT) factory, connected car, or smart energy grid, for example. A specific set of resources and network topology may be provided for a use case in terms of connectivity, speed and capacity.

There may be situations where a set of UEs should be moved from a first logical radio network to a second logical radio network. For example, a logical radio network serving a group of UEs may not be available in a certain geographical area or one or more logical radio networks may be damaged such that network management and orchestration cannot compensate the occurred problems.

In order to maintain service continuity for a plurality of UEs served by a logical radio network, the plurality of UEs should efficiently reconnect or handover to a different logical radio network capable of offering a similar performance experience. Further, a plurality of UEs need to release and reconnect radio and PDU sessions at the same time which may cause challenges for allocating and controlling network resources.

Figure 2:
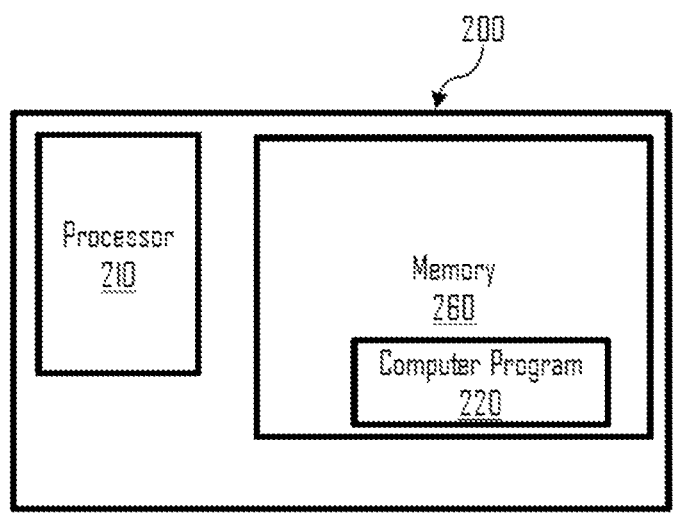
FIG. 2 shows a block diagram of an example apparatus in which examples of the disclosed embodiments may be applied.

FIG. 2 is a block diagram depicting an apparatus 200 operating in accordance with an example embodiment of the invention. The apparatus 200 may be, for example, an electronic device such as a chip, chipset, an electronic module, a terminal device, a network function or an access node such as a base station. The apparatus comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises a network function (NF). An NF comprises a functional block within a network infrastructure comprising defined external interfaces and a defined functional behaviour. An NF may comprise a network node or a physical appliance. According to an example embodiment, the NF comprises a core network function.

According to an example embodiment, the apparatus 200 comprises an access and mobility management function (AMF). As mentioned above, an AMF is configured to receive a PDU session establishment request from a terminal device such as a UE and handle connection and mobility aspects and determine which SMF is suitable for handling the connection request. A mobile network may comprise a plurality of AMF instances and, therefore, an AMF is associated with an identifier. The identifier may comprise a globally unique AMF identifier (GUAMI). A GUAMI enables routing messages from a UE via different access networks to a same AMF.

The apparatus 200 such as an AMF may be configured to communicate with one or more other network functions, one or more terminal devices and/or one or more radio access networks (RANs). For example, the apparatus 200 may be configured to receive connection and session related information from a terminal device such as user equipment (UE), handle connection and mobility management tasks and/or forward information to other network functions such as to a session management function (SMF).

According to an example embodiment, the apparatus 200 is configured to serve a first logical radio network and a second logical radio network. The apparatus 200 may be configured to serve more than two logical radio networks. For example, the apparatus 200 may be configured to serve from three to eight logical radio networks. According to an example embodiment, the apparatus 200 is configured to serve a UE and logically belong to a plurality of logical radio networks serving the UE. For example, if a UE is served by four logical radio networks, the apparatus 200 is a common resource for the four logical radio networks. According to an example embodiment, the first logical radio network is different from the second logical radio network.

According to an example embodiment, the first logical radio network and the second logical radio network share a common physical network infrastructure. Even though the first logical radio network and the second logical radio network share a common physical infrastructure, they are configured to operate independent of each other. The first logical radio network may serve a plurality of terminal devices independent of the second logical radio network. Similarly, the second logical radio network may serve a plurality of terminal devices independent of the first logical radio network. According to an example embodiment, a terminal device may be served by the first logical radio network and the second logical radio network. A logical radio network may comprise dedicated and/or shared resources such as processing power, storage and/or bandwidth.

According to an example embodiment, the first logical radio network and the second logical radio network comprise virtual instances of a common radio access network node. According to an example embodiment, the second logical radio network is configured to offer a similar performance as the first logical radio network.

Without limiting the scope of the claims, an advantage of the second logical radio network being configured to offer a similar performance as the first logical radio network is that a handover of a terminal device from the first logical radio network to the second logical radio network may be performed such that service disruption may be at least partially avoided.

According to an example embodiment, the first logical radio network and the second logical radio network are available in the same geographical area. A geographical area may comprise an area defined by cell location and coverage or an area defined by geographical coordinates. A geographical area may comprise a tracking area or a plurality of tracking areas. A tracking area may comprise a set of cells and/or (e/g)NodeBs wherein the apparatus 200 is not required to update its location to the network. Upon reselecting a cell, belonging to different tracking area or moving out of the area where the apparatus 200 is currently registered, the apparatus 200 may be required to update its location to the network.

According to an example embodiment, the first logical radio network comprises a first network slice and the second logical radio network comprises a second network slice. A network slice may comprise a plurality of different physical sub-networks such as a sub-network of a radio access network (RAN), a core network (CN) and/or a transport network. A network slice may be configured to serve a plurality of terminal devices and a terminal device may be served by a plurality of independent network slices.

According to an example embodiment, the first logical radio network is identified by a first identifier and the second logical radio network slice is identified by a second identifier. An identifier associated with a logical radio network may comprise one or more components. According to an example embodiment, a logical radio network is identified by a single—network slice selection assistance information (S-NSSAI). The S-NSSAI may comprise two components: a slice/service type (SST) and an optional slice differentiator (SD).

According to an example embodiment, the apparatus 200 is further configured to receive information on the first logical radio network. According to an example embodiment, the information on the first logical radio network enables identifying at least one group of terminal devices associated with the first logical radio network.

Information on the first logical radio network may comprise information relating to operation of the first logical radio network. According to an example embodiment, information the first logical radio network comprises information on a status of the first logical radio network.

According to an example embodiment, information on the first logical radio network comprises information on performance and/or fault reporting of the first logical radio network. For example, information on the first logical radio network may comprise information on a faulty first logical radio network and/or a need to abandon the first logical radio network.

According to an example embodiment, the information on the first logical radio network comprises a single—network slice selection assistance information (S-NSSAI). The information on the first logical radio network may further comprise other types of information.

According to another example embodiment, the information on the first logical radio network comprises group information on one or more terminal devices served by the first logical radio network. According to an example embodiment, the group information comprises a group ID associated with a group of terminal devices.

According to an example embodiment, a group ID is associated with a plurality of devices thereby enabling identifying terminal devices belonging to a same group. According to an example embodiment, a group ID comprises a string identifying a group of devices associated with a plurality of IMSIs. A table of group IDs associated with an S-NSSAI maybe stored by a network slice selection function (NSSF).

The apparatus 200 may be configured to receive information on the first logical network from one or more terminal devices or from different network functions. Information received from a terminal device or different network functions may be different.

According to an example embodiment, the apparatus 200 is configured to receive information on the first logical radio network from a network management function, a policy controlling function or a radio access network.

A network management function may comprise, for example, a function responsible for operations, administration and maintenance (OAM) of the network. An OAM is configured to provide functions for, for example, detection of faults and performance degradation. Assuming the apparatus 200 receives the information on the first logical radio network from a network management function, the information may comprise, for example, a S-NSSAI.

A policy controlling function (PCF) is configured to provide rules for user plane functions such as providing logical radio networks, roaming and mobility management for a UE. Assuming the apparatus 200 receives the information on the first logical radio network from a policy controlling function, the information may comprise, for example, at least one a group ID associated with a group of terminal devices.

A radio access network (RAN) is configured to provide a connection between a terminal device and a core network.

According to an example embodiment, the apparatus 200 is configured to identify at least one group of terminal devices associated with the first logical radio network. According to an example embodiment, the apparatus 200 is configured to identify at least one group of terminal devices associated with the first logical radio network based on the received information on the first logical radio network. For example, the apparatus 200 may be configured to identify at least one group of terminal devices comprising subscription to the first logical radio network or at least one group being served by the first logical radio network.

Identifying at least one group of terminal devices may comprise identifying one or more devices affected by a fault or performance degradation of the first logical radio network. Identifying the at least one group may be performed based on a group ID.

According to an example embodiment, a terminal device is associated with a group ID. Terminal devices belonging to a same group comprise a common group ID. For example, a first terminal device served by a logical radio network may comprise the same group ID as a second terminal device served by the same logical radio network. In other words, terminals comprising the same group ID may be identified as one group. Terminals belonging to a group may be identified by terminal specific IDs such as IMSIs.

According to an example embodiment, the group of terminal devices comprises a group of terminal devices served by the first logical radio network. According to another example embodiment, the group of terminal devices comprises a group of terminal devices served by the first logical radio network and comprising a valid subscription to the second logical radio network. A valid subscription comprises a recorded subscription. For example, the group of terminal devices may comprise a group of UEs that are served by a first network slice and that have a valid subscription to a second network slice. According to a further example embodiment, the group of terminal devices comprises a group of terminal devices that have control plane connectivity towards a single and common apparatus 200.

According to an example embodiment, the apparatus 200 is configured to identify a plurality of groups of terminal devices associated with the first logical radio network. For example, the apparatus 200 may be configured to identify a first group of terminal devices associated with the first logical radio network and having a valid subscription to a second logical radio network. The apparatus 200 may further be configured to identify a second group of terminal devices associated with the first logical radio network and having a valid subscription to a third logical radio network.

According to an example embodiment, the apparatus 200 is configured to identify the group of terminal devices based on subscription information associated with the group of terminal devices. According to an example embodiment, the apparatus 200 is configured to receive subscription information on one or more terminal devices. According to an example embodiment, the apparatus is configured to determine that a terminal device has a valid subscription to the first logical radio network. According to an example embodiment, the apparatus 200 is configured to determine that a terminal device has a valid subscription to the second logical radio network.

According to an example embodiment, the subscription information comprises information on subscribed logical radio networks. For example, subscription information may comprise one or more S-NSSAIs.

The apparatus 200 may be configured to derive the group ID based on information from a terminal device or based on information from other network functions. For example, assuming the apparatus 200 receives a request from a terminal device to switch from a first logical radio network to a second logical radio network, the apparatus 200 may be configured to determine based on the group ID that the terminal belongs to a group of terminal devices and further determine whether also other terminal devices belonging to the group should be switched from the first logical radio network to the second logical radio network.

As another example, the NSSF may comprise a table of group IDs associated with S-NSSAIs and the NSSF may be configured to make the table of group IDs available to different network functions. For example, faulty behaviour of a logical radio network may be identified by an OAM which notifies the S-NSSAI of the faulty logical radio network to a PCF and/or RAN and the PCF and/or RAN then acquire the group IDs from the NSSF based on the S-NSSAI.

As mentioned above, the apparatus 200 is configured to receive information on the first logical radio network. According to an example embodiment, the received information on the first logical radio network comprises a bulk message comprising details of the at least one group of terminal devices.

A bulk message may comprise a message that comprises details of a plurality of terminal devices, that reside in the same network slice. For example, a bulk message may comprise details of terminal devices with corresponding service performance characteristics. A bulk message may further comprise an indication of a need to establish a new PDU session for a group of terminal devices. A message may comprise a single message or a plurality of messages.

Without limiting the scope of the claims, an advantage of using a bulk message is that details of a plurality of terminal devices may be provided in a single message. This enables saving network resources as the number of sent messages may be reduced.

According to an example embodiment, the bulk message comprises a reference to a list of identifiers. According to an example embodiment, the list of identifiers comprises a list of UE IDs for the group of terminal devices. A UE ID may comprise, for example, an IMSI or a SUPI.

According to an example embodiment, the bulk message comprises an indication of a need to establish a new PDU session for the group of terminal devices.

The apparatus 200 is configured to check the subscription details and ensure logical radio network connectivity permissions. According to an example embodiment, the apparatus 200 is configured to send a bulk message to a data management function for requesting information on a permission for the group of terminal devices to establish a connection to the second logical radio network. The data management function may comprise, for example, a unified data management function (UDM).

The apparatus 200 is further configured to consult whether the group of terminal devices are allowed to be connected to a particular logical radio network. According to an example embodiment, the apparatus 200 is configured to send a bulk message to a logical radio network selection function for requesting information on a permission for the group of terminal devices to establish a connection to the second logical radio network. The logical radio network selection function may comprise, for example, network slice selection function (NSSF) configured to determine allowed NSSAI.

According to an example embodiment, the apparatus 200 is configured to send an instruction to a network function to establish a connection to the second logical radio network for the at least one group of terminal devices. According to an example embodiment, the instruction to establish a connection to the second logical radio network for a group of terminal devices comprises an instruction to establish dedicated connections to the second logical network for the terminal devices in the group of terminal devices. For example, the instruction to establish to establish a connection to the second logical radio network for a group of terminal devices may comprise an instruction to establish a connection to the second logical network for each of the terminal devices in the group of terminal devices. The network function may comprise, for example, session management function (SMF) configured to establish, modify and release sessions.

According to an example embodiment, the instruction to the network function comprises a bulk message comprising session establishment details for establishing a connection to the second logical radio network for the group of terminal devices. According to an example embodiment, establishing a connection for the group of terminal devices comprises establishing dedicated connections to the second logical network for the terminal devices in the group of terminal devices. For example, establishing a connection to the second logical radio network for a group of terminal devices may comprise establishing a connection to the second logical network for each of the terminal devices in the group of terminal devices.

The bulk message comprising session establishment details may comprise different attributes for establishing a protocol data unit (PDU) session. For example, session establishment details may comprise a data network name (DNN), 5G quality of service (QoS) indicator (5QI), or the like.

The network function, for example SMF, is configured to establish a bearer between terminal devices and radio access networks. Establishing a bearer comprises allocating a UPF and establishing a new PDU session for the requested terminal devices.

A bearer is a telecommunication service that is used for transferring user data and/or control signals between two pieces of equipment. There are different types of bearers: a data bearer configured to transfer data, a signalling bearer configured to carry signalling data and a radio bearer between a base station and user equipment. In other words, a bearer is a tunnel used for connecting a user equipment to Packet Data Networks (PDN) such as the internet. Different bearer services may differ by their information transfer characteristics (e.g. data transfer rate, direction(s) of data flow, type of transfer and/or other physical characteristics), methods of accessing the service, interworking requirements and other general attributes. For example, different QoS may be associated with different data bearers.

The apparatus 200 is configured to receive an acknowledgement message from the network function when the requested PDU sessions are established.

The apparatus 200 is configured to communicate, when the requested PDU sessions are established, with a radio access network for performing a handover of the group of terminal devices from the first logical radio network to the second logical radio network.

According to an example embodiment, the apparatus 200 is configured to trigger a radio access network to perform a handover from the first logical radio network to the second logical radio network. According to an example embodiment, the apparatus 200 is configured to trigger the radio access network associated with the first logical radio access network. In other words, the apparatus 200 is configured to trigger the radio access network from the group of terminal devices is transferred to perform the handover. Alternatively, the apparatus 200 may be configured to trigger the radio access network to which the group of terminal devices is to be transferred to perform the handover.

According to an example embodiment, the radio access network triggered by the apparatus 200 comprises a radio access network associated with the first logical radio network. The radio access network associated with the first logical radio network may be the same as the radio access network associated with the second logical radio network or different from the radio access network associated with the second logical radio network.

When the handover is completed, the first logical radio network may be released. Releasing a logical radio network may comprise releasing and/or reconfiguring resources allocated for the logical radio network.

According to an example embodiment, the apparatus 200 is configured to instruct a network function associated with the first logical radio network to release a connection to the first logical radio network. The radio network connection may comprise, for example, session management function (SMF) configured to establish, modify and release sessions.

An instruction to release a connection comprises information for identifying the connection. For example, an instruction to release a PDU session may comprise a PDU session ID for identifying the correct session to be released. A PDU session ID may be generated by a terminal device when a PDU session is established.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for serving a first logical radio network and a second logical radio network, means for receiving information on the first logical radio network, means for identifying at least one group of terminal devices associated with the first logical radio network and means for sending an instruction to a network function to establish a connection to the second logical radio network for the at least one group of terminal devices.

The apparatus 200 may further comprise means for identifying the group of terminal devices based on subscription information associated with the group of terminal devices. The subscription information may comprise information on subscribed logical radio networks. The apparatus 200 may further comprise means for receiving the information on the first logical radio network from a network management function, a policy controlling function or a radio access network. The apparatus 200 may further comprise means for sending a bulk message to a data management function for requesting information on a permission for the group of terminal devices to establish a connection to the second logical network and/or means for sending a bulk message to a logical radio network selection function for requesting information on a permission for the group of terminal devices to establish a connection to the second logical radio network. The apparatus 200 may further comprise means for causing the apparatus 200 to trigger a radio access network to perform a handover from the first logical radio network to the second logical radio network and/or means for instructing a network function associated with the first logical radio network to release a connection to the first logical radio network.

Figure 3:
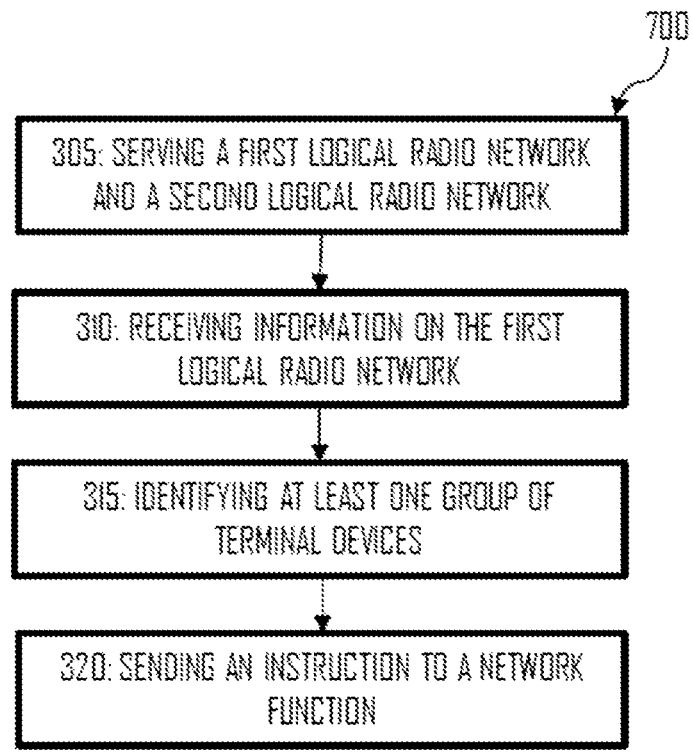
FIG. 3 illustrates an example method according to an example embodiment of the invention.

FIG. 3 illustrates an example method 300 incorporating aspects of the previously disclosed embodiments. More specifically the example method 300 illustrates establishing a connection for at least one group of terminal devices. The method may be performed, for example, by the apparatus 200 such as an AMF.

The method starts with serving 305 a first logical radio network and a second logical radio network. The first logical radio network may comprise a first network slice and the second logical radio network may comprise a second network slice.

The method continues with receiving 310 information on the first logical radio network. The information may comprise, information relating to operation of the first logical radio network such as information on performance and/of fault reporting of the first logical radio network.

The information on the first logical radio network may be received from different network functions such as a network management function, a policy controlling function or a radio access network. A network management function may comprise, for example, an OAM and a policy controlling function may comprise, for example, a PCF.

Information from a policy controlling function may be received as a bulk message comprising identification information of the group of terminal devices. Identification information of the group of terminal devices may be referred to as a group ID and it may comprise, for example, a list of international mobile subscriber identifiers (IMSIs) or subscription permanent identifiers (SUPIs).

The method further continues with identifying 315 at least one group of terminal devices associated with the first logical radio network. The at least one group of terminal devices may be identified based on subscription information associated with the plurality of terminal devices. Subscription information may comprise, for example, information on one or more logical radio network subscribed by a terminal device.

The method further continues with sending 320 an instruction to a network function to establish a connection to the second logical radio network for the at least one group of terminal devices.

Figure 4:
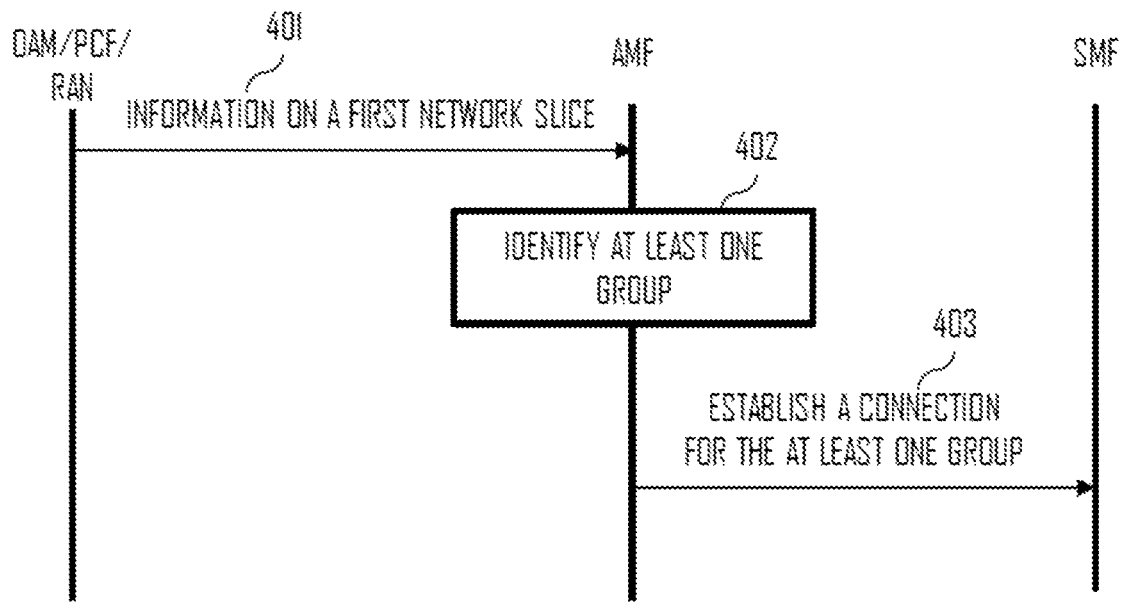
FIG. 4 illustrates an example signalling diagram according to an example embodiment of the invention.

FIG. 4 illustrates an example signalling diagram 400 depicting re-assignment of a logical radio network. In the example of FIG. 4, the apparatus 200 comprises an access and mobility management function (AMF) that is configured to serve a first logical radio network and a second logical radio network. In the example of FIG. 4, the first logical radio network comprises a first network slice and the second logical radio network comprises a second network slice.

In the example of FIG. 4, the AMF receives information 401 on the first network slice. The information may comprise information on operation of the first network slice such as information on performance and/or fault reporting of the first logical radio network. Alternatively, or additionally, the information may comprise an indication of a need to abandon the first network slice.

The AMF may receive the information on the first network slice from different network functions such as an operations, administration and management function (OAM), a policy controlling function (PCF) or radio access network (RAN).

The AMF identifies 402 at least one group of terminal devices associated with the first logical radio network. In the example of FIG. 4, the AMF is configured to identify the group of terminal devices based on subscription information associated with the group of terminal devices. The subscription information comprises information on subscribed logical radio networks such as subscribed network slices.

When the at least one group of terminal devices is identified, the AMF sends an instruction 403 to a service management function (SMF) to establish a connection to the second logical radio network for the at least one group of terminal devices.

As mentioned above, the AMF may receive information on the first logical radio network from an OAM, PCF or RAN. In the examples below, these embodiments are illustrated in terms of signalling diagrams.

Figure 5:
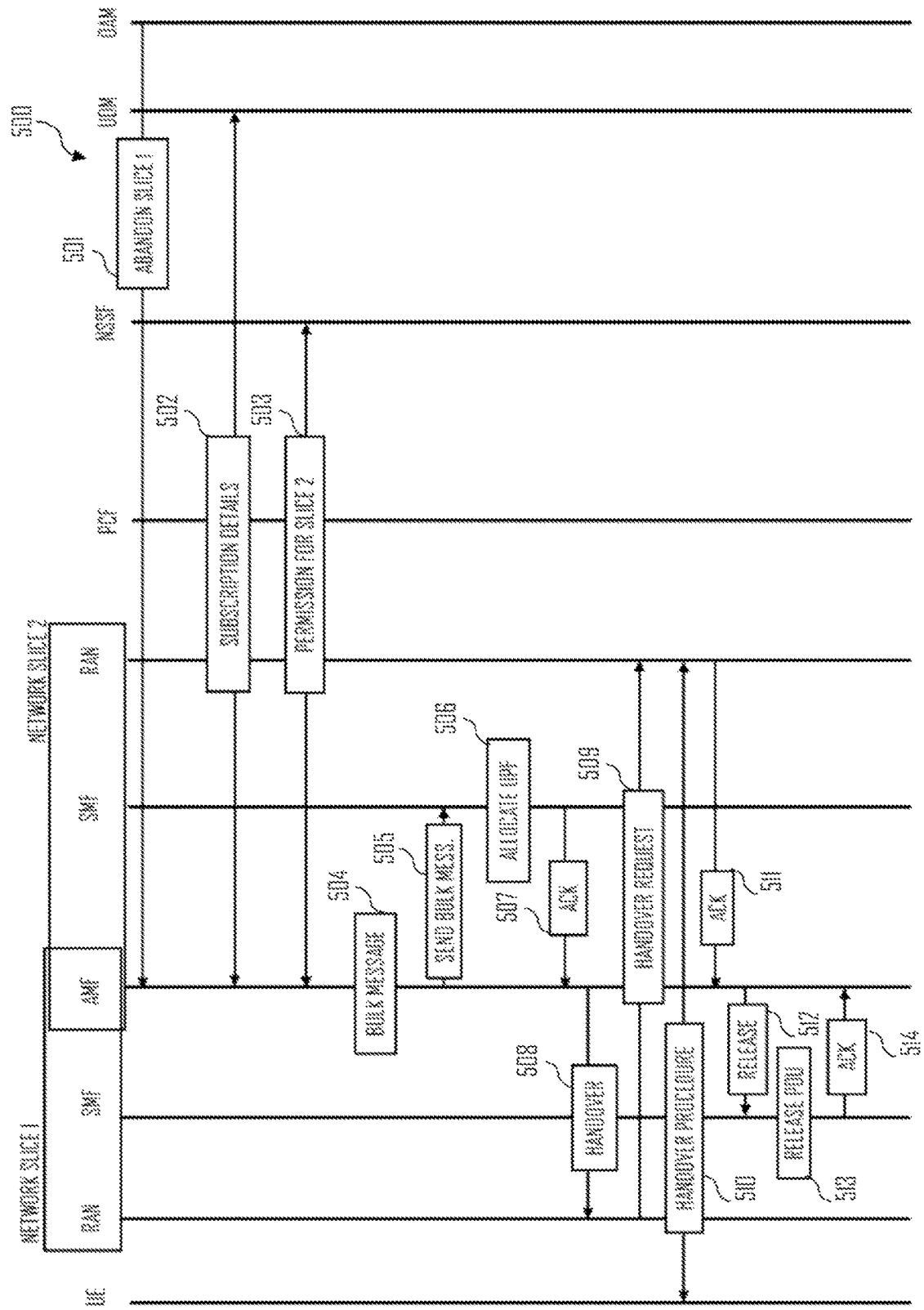
FIG. 5 illustrates another example signalling diagram according to an example embodiment of the invention.

FIG. 5 illustrates another example signalling diagram 500 depicting re-assignment of a logical radio network in case where an AMF receives information on a first logical radio network from an OAM. In the example of FIG. 5, the first logical radio network comprises a first network slice. The AMF is configured to serve a first network slice (network slice 1 in FIG. 5) and a second network slice (network slice 2 in FIG. 5). Hence, the AMF is common function for the first network slice and the second network slice.

In the example of FIG. 5, the AMF receives information on the first network slice from an OAM. The information may comprise information relating to operation of the first network slice such as information on performance and/of fault reporting of the first network slice. In the example of FIG. 5, the information comprises an indication 501 of a necessity to abandon the first network slice and the single-network slice selection assistance information (S-NSSAI) of the first network slice.

In response to receiving the information on the first network slice, the AMF requests and receives subscription details 502 from a unified data management (UDM). The UDM is configured to store subscriber data and subscriber profiles and the UDM is further configured to support user identification handling, access control and authorization, authentication management and subscription management. The AMF may request the subscription information using a bulk message.

The bulk message may comprise a message that comprises details of a plurality of terminal devices. In the example of FIG. 5, the bulk message comprises IDs of terminal devices being served by the first network slice. In response to the bulk message, the AMF receives information from the UDM on network slices subscribed by the terminal devices. A bulk message may comprise a single message or a plurality of messages each of the plurality of messages comprising a plurality of IDs of terminal devices. The AMF is configured to identify, based on the subscription information received from the UDM, at least one group of terminal devices that are served by the first network slice and have a valid subscription to a second network slice.

The AMF consults a network slice selection function (NSSF) whether the at least one group of terminal devices may be connected to a particular network slice. In the example of FIG. 5, the AMF requests the NSSF for a permission 503 to connect the at least one group of terminal devices to the second network slice.

In response to receiving information that the at least one group of devices may be connected to the second network slice, the AMF creates a bulk message 504 grouping a plurality of terminal devices together for a suitable service management function (SMF) associated with the second network slice. The SMF is configured to manage protocol data unit (PDU) sessions and manage session context with the user plane function (UPF) that is configured to support data packet routing and forwarding, and data packet inspection, for example.

In the example of FIG. 5, the AMF sends to the SMF 505 the bulk message that comprises IDs of a plurality of terminal devices and details for establishing a PDU session. Details for establishing a connection to the second network slice may comprise, for example, data for establishing PDU session such as a data network name (DNN), 5G quality of service (QoS) indicator (5QI), or the like.

The SMF in the second network slice then allocates 506 an appropriate UPF and establishes desired PDU sessions for the plurality of terminal devices. When the desired PDU sessions are established, the SMF responds to the AMF with an acknowledgement 507 that the desired PDU sessions are established.

In the example of FIG. 5, in response to receiving the acknowledgement 507 from the SMF, the AMF triggers a radio access network (RAN) associated with the first network slice to perform the network slice handover 508 from the first network slice to the second network slice. The RAN may comprise, for example, gNodeB. The RAN associated with the first network slice notifies a RAN associated with the second network slice about the handover using a handover request 509. When the handover procedure 510 from the first network slice to the second network slice is performed, the RAN associated with the second network slice sends an acknowledgement 511 to the AMF that the handover is completed.

The AMF then notifies the SMF in the first network slice that a PDU session for the group of terminal devices is established and the AMF instructs the SMF in the first network slice to release 512 and/or reconfigure resources allocated for the first network slice. When the release 513 is completed, the SMF acknowledges 514 the AMF than the release is completed.

Figure 6:
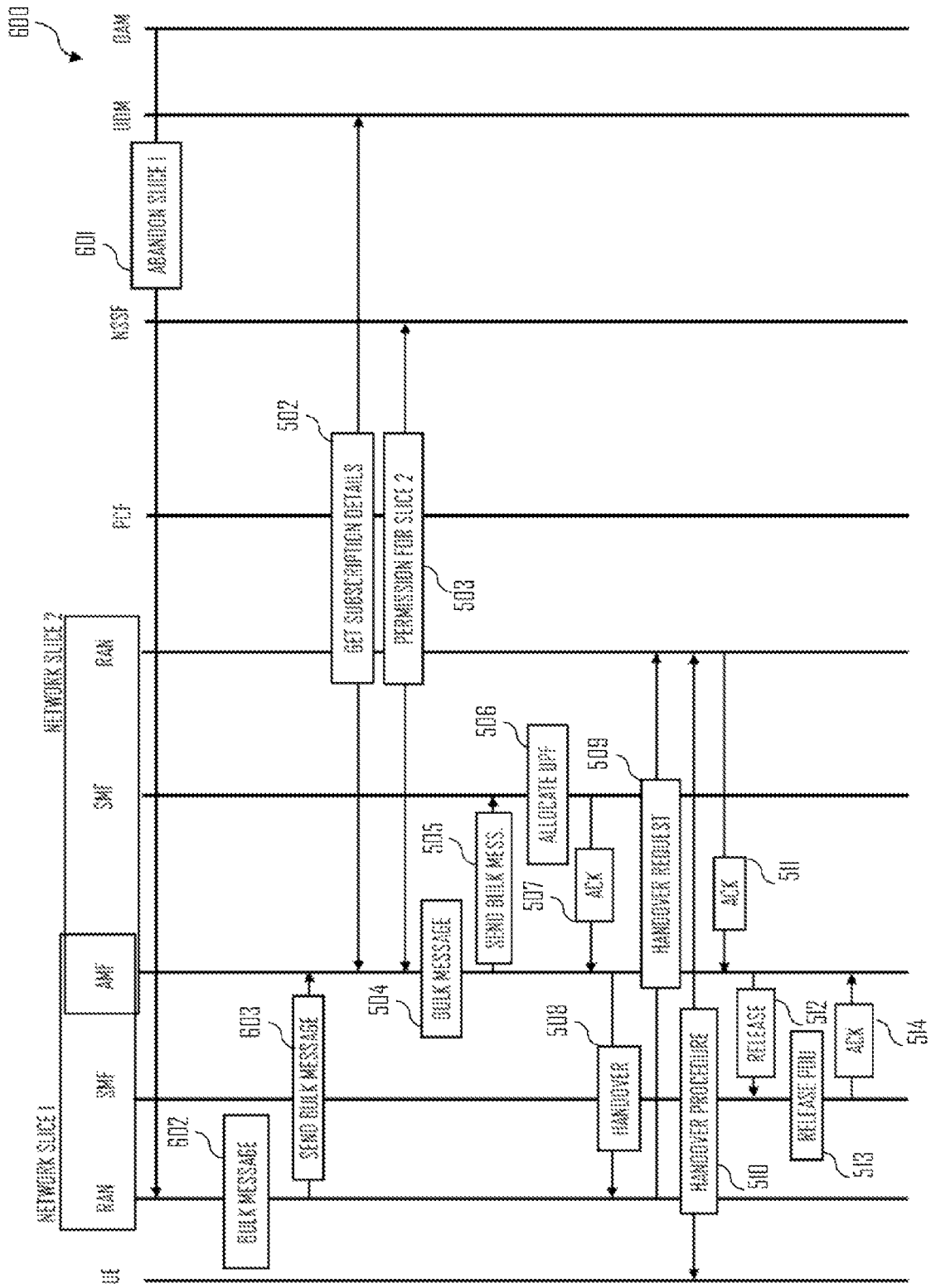
FIG. 6 illustrates a further example signalling diagram according to an example embodiment of the invention.

FIG. 6 illustrates yet another example signalling diagram 600 depicting re-assignment of a logical radio network in case where an AMF receives information on a first logical radio network from a RAN associated with first logical radio network. In the example of FIG. 6, the first logical radio network comprises a first network slice. The AMF is configured to serve a first network slice (network slice 1 in FIG. 6) and a second network slice (network slice 2 in FIG. 6). Hence, the AMF is common function for the first network slice and the second network slice.

When a terminal device such as a UE accesses a network, the terminal device sets up a connection with a RAN which belongs to a network slice. A network slice comprises an AMF and therefore, the RAN is aware of network slicing and the relation between a UE and an AMF.

In the example of FIG. 6, the RAN associated with the first network slice receives information on the first network slice from an OAM. The information may comprise information relating to operation of the first network slice such as information on performance and/of fault reporting of the first network slice. In the example of FIG. 6, the information comprises an indication 601 of a necessity to abandon the first network slice the S-NSSAI of the first network slice.

As the RAN associated with the first network slice is aware of slicing and the relation between UE and the AMF, the RAN creates a bulk message 602 comprising IDs of a plurality of terminal devices. The bulk message 602 further comprises a group ID and an indication that there is a need to establish new PDU sessions for the plurality of terminal devices associated with the group ID. In other words, if the group of terminal devices comprises, for example, 10 terminal devices, 10 PDU sessions need to be established.

In response to receiving 603 the bulk message from the RAN associated with the first network slice, the AMF sends a message 502 to a unified data management (UDM) in order to receive subscription details of the group of terminal devices.

The UDM is configured to store subscriber data and subscriber profiles and the UDM is further configured to support user identification handling, access control and authorization, authentication management and subscription management. The AMF may request the subscription information using a bulk message. The bulk message may comprise a single message or a plurality of messages each of the plurality of messages comprising a plurality of IDs of terminal devices.

The bulk message from the AMF to the UDM may comprise a message that comprises details of a plurality of terminal devices. In the example if FIG. 6, the bulk message comprises IDs of terminal devices being served by the first network slice. In response to requesting the subscription information, the AMF receives information from the UDM on network slices subscribed by the terminal devices. The AMF is configured to identify, based on the subscription information received from the UDM, at least one group of terminal devices that are served by the first network slice and have a valid subscription to a second network slice.

The AMF further consults a network slice selection function (NSSF) whether the at least one group of terminal devices may be connected to a particular network slice. In the example of FIG. 6, the AMF requests the NSSF for a permission 503 to connect the at least one group of terminal devices to the second network slice.

In response to receiving information that the at least one group of devices may be connected to the second network slice, the AMF creates a bulk message 504 grouping a plurality of terminal devices together for a suitable service management function (SMF) associated with the second network slice. The SMF is configured to manage protocol data unit (PDU) sessions and manage session context with the user plane function (UPF) that is configured to support data packet routing and forwarding, and data packet inspection, for example.

In the example of FIG. 6, AMF sends to the SMF 505 the bulk message that comprises IDs of a plurality of terminal devices and details for establishing a PDU session. Details for establishing a connection to the second network slice may comprise, for example, data for establishing PDU session such as a data network name (DNN), 5G quality of service (QoS) indicator (5QI), or the like.

The SMF in the second network slice then allocates 506 an appropriate UPF and establishes desired PDU sessions for the plurality of terminal devices. When the desired PDU sessions are established, the SMF responds to the AMF with an acknowledgement 507 that the desired PDU sessions are established.

In the example of FIG. 6, in response to receiving the acknowledgement 507 from the SMF, the AMF triggers a radio access network (RAN) associated with the first network slice to perform the network slice handover 508 from the first network slice to the second network slice. The RAN may comprise, for example, gNodeB. The RAN associated with the first network slice notifies a RAN associated with the second network slice about the handover using a handover request 509. When the handover procedure 510 from the first network slice to the second network slice is performed, the RAN associated with the second network slice sends an acknowledgement 511 to the AMF that the handover is completed.

The AMF then notifies the SMF in the first network slice that a PDU session for the group of terminal devices is established and the AMF instructs the SMF in the first network slice to release 512 and/or reconfigure resources allocated for the first network slice. When the release 513 is completed, the SMF acknowledges 514 the AMF than the release is completed.

Figure 7:
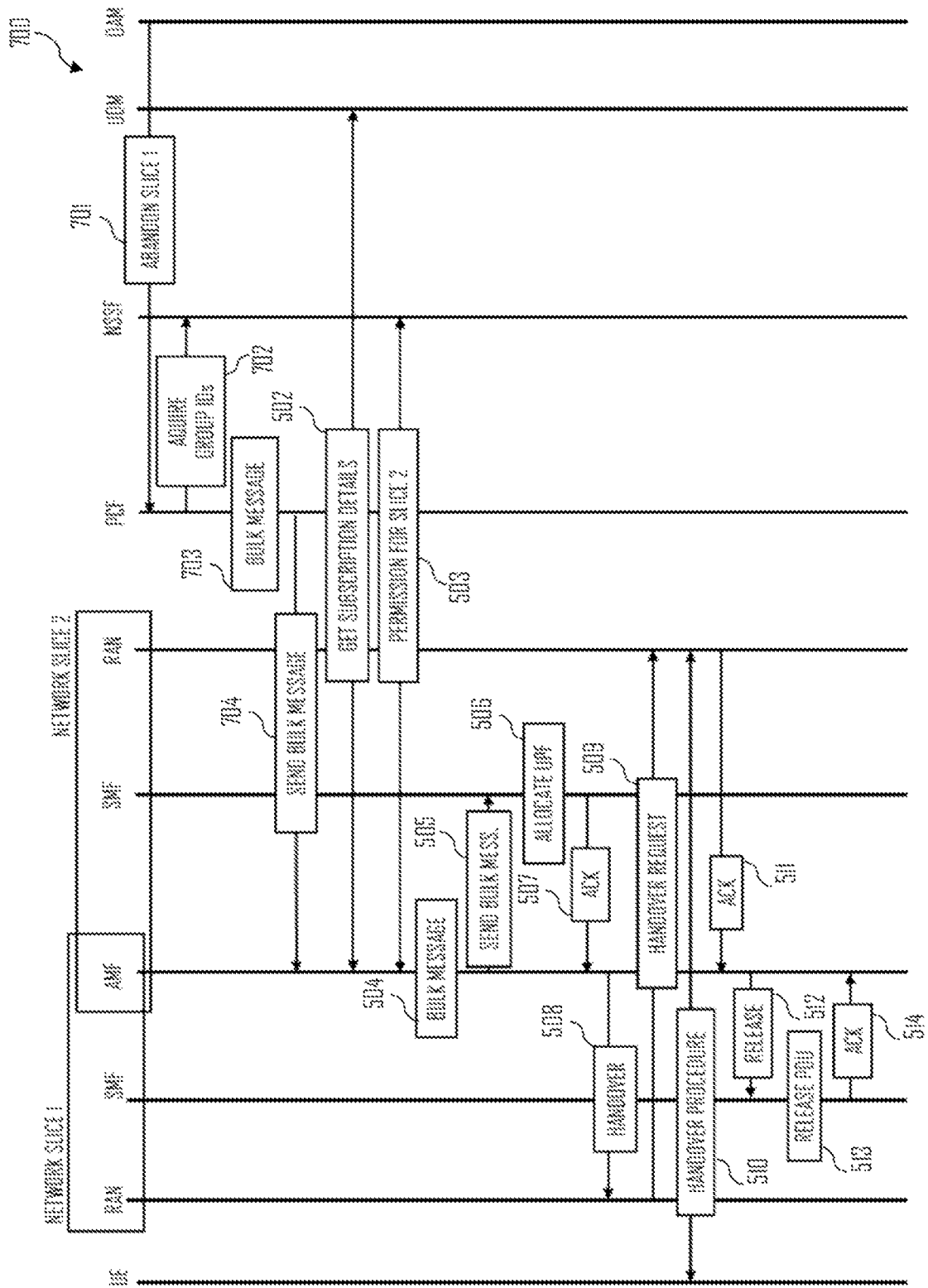
FIG. 7 illustrates a yet further example signalling diagram according to an example embodiment of the invention.

FIG. 7 illustrates a yet further example signalling diagram 700 depicting re-assignment of a logical radio network in case where an AMF receives information on a first logical radio network from a policy controlling function (PCF). In the example of FIG. 7, the first logical radio network comprises a first network slice. The AMF is configured to serve a first network slice (network slice 1 in FIG. 7) and a second network slice (network slice 2 in FIG. 7). Hence, the AMF is common function for the first network slice and the second network slice.

In the example of FIG. 7, the PCF receives information on the first network slice from an OAM. The information may comprise information relating to operation of the first network slice such as information on performance and/of fault reporting of the first network slice. In the example of FIG. 7, the information comprises an indication of a necessity to abandon 701 the first network slice and the S-NSSAI of the first network slice.

The PCF acquires 702 group IDs for the plurality of terminal devices from a NSSF that stores a table comprising group IDs associated with S-NSSAIs. In response to receiving the group IDs, the PCF creates a bulk message 703 comprising IDs of a plurality of terminal devices. The bulk message further comprises at least one group ID and an indication that there is a need to establish new PDU sessions for the plurality of terminal devices associated with the at least one group ID. In other words, if the group of terminal devices comprises, for example, ten terminal devices, ten PDU sessions need to be established.

The PCF sends the bulk message 704 comprising UE details of the plurality of terminal devices to the AMF. The bulk message may comprise a single message or a plurality of messages each of the plurality of messages comprising a plurality of IDs of terminal devices.

The AMF then creates a bulk message for requesting 502 subscription details from the UDM. The bulk message from the AMF to the UDM may comprise a message comprising details of a plurality of terminal devices. In the example of FIG. 7, the bulk message comprises IDs of terminal devices being served by the first network slice. In response to requesting the subscription information, the AMF receives information from the UDM on network slices subscribed by the terminal devices. The AMF is configured to identify, based on the subscription information received from the UDM, at least one group of terminal devices that are served by the first network slice and have a valid subscription to a second network slice.

The AMF further consults a network slice selection function (NSSF) whether the at least one group of terminal devices may be connected to a particular network slice. In the example of FIG. 7, the AMF requests the NSSF for a permission 503 to connect the at least one group of terminal devices to the second network slice.

In response to receiving information that the at least one group of devices may be connected to the second network slice, the AMF creates a bulk message 504 grouping a plurality of terminal devices together for a suitable service management function (SMF) associated with the second network slice. The SMF is configured to manage protocol data unit (PDU) sessions and manage session context with the user plane function (UPF) that is configured to support data packet routing and forwarding, and data packet inspection, for example.

In the example of FIG. 7, the AMF sends to the SMF 505 the bulk message that comprises IDs of a plurality of terminal devices and details for establishing a PDU session. Details for establishing a connection to the second network slice may comprise, for example, data for establishing PDU session such as a data network name (DNN), 5G quality of service (QoS) indicator (5QI), or the like.

The SMF in the second network slice then allocates 506 an appropriate UPF and establishes desired PDU sessions for the plurality of terminal devices. When the desired PDU sessions are established, the SMF responds to the AMF with an acknowledgement 507 that the desired PDU sessions are established.

In the example of FIG. 7, in response to receiving the acknowledgement 507 from the SMF, the AMF triggers a radio access network (RAN) associated with the first network slice to perform the network slice handover 508 from the first network slice to the second network slice. The RAN may comprise, for example, gNodeB. The RAN associated with the first network slice notifies a RAN associated with the second network slice about the handover using a handover request 509. When the handover procedure 510 from the first network slice to the second network slice is performed, the RAN associated with the second network slice sends an acknowledgement 511 to the AMF that the handover is completed.

The AMF then notifies the SMF in the first network slice that a PDU session for the group of terminal devices is established and the AMF instructs the SMF in the first network slice to release 512 and/or reconfigure resources allocated for the first network slice. When the release 513 is completed, the SMF acknowledges 514 the AMF than the release is completed.

Without limiting the scope of the claims, an advantage of one or more example embodiments disclosed herein is that a group handover of terminal devices from a first logical radio network to a second logical radio network may be performed. Another advantage is that the handover is network driven thereby enabling an efficient, proactive handover.

Without in any way limiting the scope, interpretation, or application of the claims appearing below, a technical effect of one or more of the example embodiments disclosed herein is that signalling may be reduced comparing to the situation when a handover is performed one terminal device at a time. Another technical effect is that handover may be performed before the QoS of the UEs is impacted by a fault or performance degradation of a logical radio network thereby enabling minimization of service disruption.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
at least one processor; and
at least one memory including computer program code,
the at least one memory and the computer program code configured to, with the at least one processor, cause the apparatus at least to:
serve a first logical radio network and a second logical radio network;
receive information on the first logical radio network;
identify at least one group of terminal devices associated with the first logical radio network, wherein the at least one group of terminal devices is based on subscription information associated with the at least one group of terminal devices and the subscription information comprises information on subscribed logical radio networks; and
send an instruction to a network function to establish a connection to the second logical radio network for the at least one group of terminal devices.

2. The apparatus according to claim 1, wherein the information on the first logical radio network comprises information on performance or fault reporting of the first logical radio network.

3. The apparatus according to claim 1, wherein the at least one memory and computer program code are further configured, with the at least one processor, to cause the apparatus to receive the information on the first logical radio network from a network management function, a policy controlling function or a radio access network.

4. The apparatus according to claim 1, wherein the received information comprises a bulk message comprising details of the at least one group of terminal devices.

5. The apparatus according to claim 4, wherein the bulk message comprises a reference to a list of identifiers.

6. The apparatus according to claim 1, wherein the at least one memory and the computer program code are further configured, with the at least one processor, to cause the apparatus to send a bulk message to a data management function for requesting information on a permission for the group of terminal devices to establish a connection to the second logical radio network.

7. The apparatus according to claim 1, wherein the at least one memory and the computer program code are further configured, with the at least one processor, to cause the apparatus to send a bulk message to a logical radio network selection function for requesting information on a permission for the group of terminal devices to establish a connection to the second logical radio network.

8. The apparatus according to claim 1, wherein the instruction to the network function comprises a bulk message comprising session establishment details for establishing a connection to the second logical radio network for the group of terminal devices.

9. The apparatus according to claim 1, wherein the first logical radio network and the second logical radio network comprise virtual instances of a common radio access network node.

10. The apparatus according to claim 9, wherein the at least one memory and the computer program code are further configured, with the at least one processor, to cause the apparatus to trigger a radio access network to perform a handover from the first logical radio network to the second logical radio network.

11. The apparatus according to claim 1, wherein the at least one memory and the computer program code are further configured, with the at least one processor, to cause the apparatus to instruct a network function associated with the first logical radio network to release a connection to the first logical radio network.

12. The apparatus according to claim 1, wherein the first logical radio network comprises a first network slice and the second logical radio network comprises a second network slice.

13. The apparatus according to claim 1, wherein the apparatus comprises an access and mobility management function.

14. A method, comprising:
serving a first logical radio network and a second logical radio network;
receiving information on the first logical radio network;
identifying at least one group of terminal devices associated with the first logical radio network, wherein the at least one group of terminal devices is based on subscription information associated with the at least one group of terminal devices and the subscription information comprises information on subscribed logical radio networks; and
sending an instruction to a network function to establish a connection to the second logical radio network for the at least one group of terminal devices.

15. A computer program embodied on a non-transitory computer-readable medium, said computer program comprising instructions which, when executed on an apparatus, cause the apparatus to perform at least:
serving a first logical radio network and a second logical radio network;
receiving information on the first logical radio network;
identifying at least one group of terminal devices associated with the first logical radio network, wherein the at least one group of terminal devices is based on subscription information associated with the at least one group of terminal devices and the subscription information comprises information on subscribed logical radio networks; and
sending an instruction to a network function to establish a connection to the second logical radio network for the at least one group of terminal devices.

16. A system configured to:
serve a first logical radio network and a second logical radio network;
receive information on the first logical radio network;
identify at least one group of terminal devices associated with the first logical radio network, wherein the at least one group of terminal devices is based on subscription information associated with the at least one group of terminal devices and the subscription information comprises information on subscribed logical radio networks; and
send an instruction to a network function to establish a connection to the second logical radio network for the at least one group of terminal devices.

* * * * *